United States Patent [19]
Zaiser

[11] 3,831,464
[45] Aug. 27, 1974

[54] PLANETARY GEAR CHANGE-SPEED TRANSMISSIONS, ESPECIALLY FOR MOTOR VEHICLES

[75] Inventor: Wolfgang Zaiser, Althutte, Germany

[73] Assignee: Daimler-Benz Aktiengesellschaft, Stuttgart, Germany

[22] Filed: Sept. 8, 1972

[21] Appl. No.: 287,216

[30] Foreign Application Priority Data
Sept. 9, 1971 Germany.................. 2145105

[52] U.S. Cl.................................... 74/763, 74/761
[51] Int. Cl............................................. F16h 51/10
[58] Field of Search........... 74/759, 763, 765, 761, 74/732; 192/87.11, 87.15, 115; 188/18 A

[56] References Cited
UNITED STATES PATENTS

| | | | |
|---|---|---|---|
| 3,063,529 | 11/1962 | Cook | 192/87.11 |
| 3,096,666 | 3/1963 | Christinson | 74/765 |
| 3,483,771 | 12/1969 | Hano-Joachin | 74/759 |
| 3,486,399 | 12/1969 | Forster | 74/765 |
| 3,491,621 | 1/1970 | Moan | 74/759 |
| 3,554,057 | 2/1971 | Michnay | 74/732 |
| 3,664,210 | 5/1972 | Laing | 74/753 |

*Primary Examiner*—Charles J. Myhre
*Assistant Examiner*—R. H. Lazarus
*Attorney, Agent, or Firm*—Craig & Antonelli

[57] ABSTRACT

A planetary gear change-speed transmission for vehicles, especially an automatically shifting change-speed transmission for motor vehicles in which two concentrically arranged lamellae friction clutches are provided at the input, and an output planetary gear set is shifted by means of a free-wheeling device and a lamellae friction device acting as a brake on the ring gear at the output of the transmission; the ring gear of the planetary gear set coordinated to the output and the outer race of the free-wheeling device are inserted into an undulatory sheet metal sleeve which simultaneously forms the inner disk carrier for the brake.

26 Claims, 1 Drawing Figure

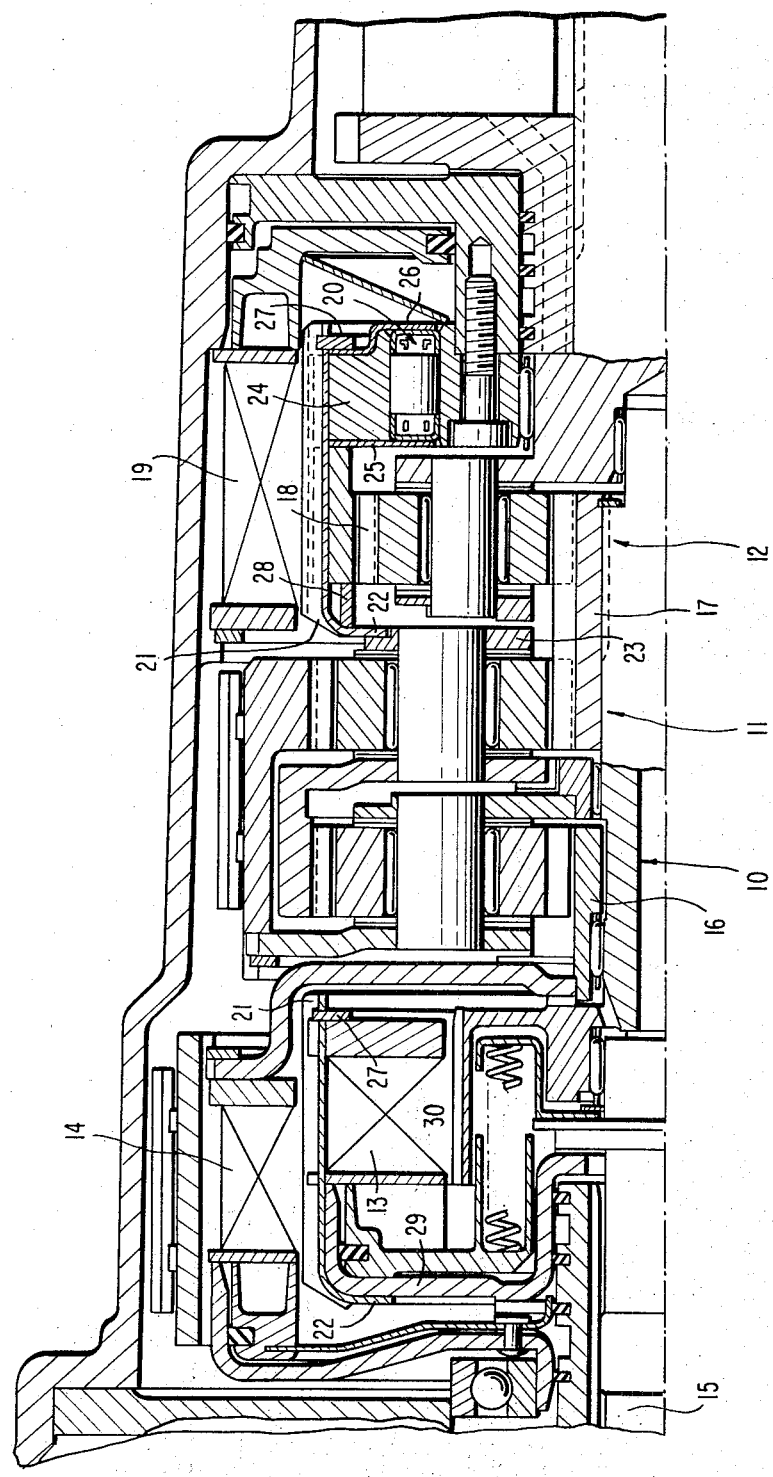

PLANETARY GEAR CHANGE-SPEED TRANSMISSIONS, ESPECIALLY FOR MOTOR VEHICLES

The present invention relates to a planetary gear change-speed transmission for vehicles, especially to an automatically shifting change-speed transmission for motor vehicles, in which two lamellae or friction disk clutches arranged concentrically one about the other are provided at the input and a planetary gear set located at the output is shifted by way of a free-wheeling device and an engageable lamellae or friction disk device acting on the ring gear as brake.

The present invention is concerned with the task to simplify the construction of the transmissions described hereinabove. Above all, the present invention aims at utilizing as many identical parts as possible and at simplifying the assembly.

The underlying problems are solved according to the present invention in the transmissions of the aforementioned type in that the ring gear of the planetary gear set coordinated to the output and the outer ring or race of the free-wheeling device are inserted into an undularly shaped sheet metal sleeve which forms simultaneously the inner lamellae or disk carrier for the brake. Preferred is thereby a solution which is characterized in that an identically constructed sheet metal sleeve is also provided at the two input clutches, is slipped thereat over a drive flange and forms simultaneously the outer lamellae or disk carrier for the inwardly disposed clutch and the inner lamellae or disk carrier for the outwardly disposed clutch.

The construction according to the present invention offers the advantage that at the input as also at the output of the transmission, identical sheet metal sleeves are used for the shifting devices. Additionally, a better possibility of assembly for the shifting device provided at the output results therefrom.

A further feature of the present invention resides in that the sheet metal sleeve is provided at its one end with an inwardly turned flange for the fastening on the drive flange or on another transmission part. Furthermore, it is proposed according to the present invention that the abutment for the clutch disks or the lamellae and/or a ring disk covering the free-wheeling device are secured at the open end of the sheet metal sleeve by means of a snap ring. Finally, the present invention provides that a ring disk also covering the free-wheeling device is arranged between the free-wheeling device and the ring gear. This takes place simply by clamping this ring disk between the outer ring or race of the free-wheeling device and the ring gear.

The embodiment proposed according to the present invention enables an identical construction of the fastening places and of the fastening means required therefor.

Accordingly, it is an object of the present invention to provide a planetary gear change-speed transmission for vehicles, especially an automatically shifting change-speed transmission for motor vehicles which avoids by simple means the aforementioned shortcomings and drawbacks encountered in the prior art.

Another object of the present invention resides in a planetary gear change-speed transmission for vehicles which considerably simplifies the over-all construction thereof.

A further object of the present invention resides in a change-speed transmission for motor vehicles which permits the use of many identical parts and additionally facilitates the assembly.

These and further objects, features and advantages of the present invention will become more apparent from the following description when taken in connection with the accompanying drawing which shows, for purposes of illustration only, one embodiment in accordance with the present invention, and wherein:

The single FIGURE is a partial longitudinal cross-sectional view through a motor vehicle change-speed transmission in accordance with the present invention.

Referring now to the single FIGURE of the drawing, the transmission consists of three planetary gear sets generally designated by reference numerals 10, 11 and 12 which are interconnected with one another in any conventional manner, for example, as disclosed in the German Pat. No. 1,064,820. This transmission construction, however, forms no part of the present invention as such, and therefore will not be described in detail herein. Two input clutches 13 and 14 are disposed at the input of the transmission, by means of which the drive shaft 15 is adapted to be connected selectively or simultaneously with the sun gear 16 of the first planetary gear set 10 or/and with the common sun gear 17 for the planetary gear sets 11 and 12. A brake 19 acting on the ring gear 18 as well as a free-wheeling device generally designated by reference numeral 20 and of conventional construction are coordinated to the planetary gear set 12 located at the transmission output. It will be understood that in operation, for example with clutch 14 engaged and clutch 13 disengaged, power will be transmitted via drive shaft 15, drive flange 29, sleeve 21, clutch 14 and sun gear 16 and then to the righthand sleeve 21 by way of its flange 22 located at the planetary gear set 12 of the transmission output. If clutch 14 is disengaged and clutch 13 is engaged, the force transmission will be in bypassing relationship to sun gear 16 and through sun gear 17 to the respective planetary gear sets 11 and 12.

A sheet metal sleeve 21 is provided at the planetary gear set 12 which is constructed corrugated or undulatory and forms a toothed means effective outwardly and inwardly, so to speak of. This sheet metal sleeve 21 is secured by means of an inwardly turned annular flange 22 at the planet gear carrier 23 of the central planetary gear set 11. The ring gear 18 and the free-wheeling outer ring or race 24 are inserted into this sheet metal sleeve 21, the ring gear 18 being thereby inserted inwardly thereof. A ring disk 25 covering the free wheeling device 20 is clamped between these two parts 18 and 24. A further ring disk 26 covers the free-wheeling device against the outside. The fastening of the aforementioned part takes place between the annular flange 22 and a snap ring 27 under interposition of a spacer ring 28. The sheet metal sleeve 21 serves simultaneously as inner lamellae or disk carrier for the brake 19. It will be understood that the planetary gear set 12 is shifted by way of the free-wheeling device 20 and the brake 19, in dependance on the actuation of the brake 19.

An identical sheet metal sleeve 21 is used with the two input clutches 13 and 14, which is slipped over a drive flange 29 non-rotatably connected with the drive shaft 15 to rotate in unison therewith and is secured thereat by means of its annular flange 22. It forms simultaneously the outer lamellae or disk carrier for the inwardly disposed clutch 13 and the inner lamellae or disk carrier for the outwardly disposed clutch 14. The abutment 30 for the inwardly disposed clutch 13 is secured by means of a snap ring 27.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A planetary gear change-speed transmission for vehicles, which includes two frictional engageable means arranged concentrically one about the other at its input and a planetary gear set at its output, said planetary gear set being shifted by way of a free-wheeling means and a frictional engaging means acting as a brake on a member of the planetary gear set, characterized in that the member of the planetary gear set and the outer ring of the freewheeling means are inserted into and supported at an undulatory sleeve means which forms simultaneously the inner disk carrier for the brake, said inner disk carrier extending circumferentially around said outer ring of the free-wheeling means at the same axial location along the length of said transmission.

2. A transmission according to claim 1, characterized in that the one member of the planetary gear set is a ring gear.

3. A transmission according to claim 2, characterized in that the undulatory sleeve means is an undulatory sheet metal sleeve.

4. A transmission according to claim 3, characterized in that the frictional engaging means are disk-type engageable means.

5. A transmission according to claim 4, characterized in that the transmission is an automatically shifting change-speed transmission for a motor vehicle.

6. A transmission according to claim 4, characterized in that a similarly constructed undulatory sleeve means is provided also at the two input engageable means, is mounted thereat over a drive flange means and forms simultaneously the outer disk carrier for the inwardly disposed engageable means and the inner disk carrier for the outwardly disposed engageable means.

7. A transmission according to claim 6, characterized in that the last-mentioned sleeve means is also a sheet metal sleeve.

8. A transmission according to claim 7, characterized in that the two input engageable means are input clutches.

9. A transmission according to claim 7, characterized in that each last-mentioned sleeve means is provided at its one end with an inwardly turned flange means for the fastening on a respective transmission part.

10. A transmission according to claim 9, characterized in that the last-mentioned transmission part is a drive flange.

11. A transmission according to claim 10, characterized in that the last-mentioned transmission part is a planet gear carrier.

12. A transmission according to claim 11, characterized in that an abutment for one of said engageable means and a ring-disk covering the free-wheeling means are secured at the open end of the sleeve means by means of snap ring means.

13. A transmission according to claim 12, characterized in that a ring disk also covering the free-wheeling means is arranged between an outer race of the free-wheeling means and the ring gear.

14. A transmission according to claim 13, characterized in that the two input engageable means are input clutches.

15. A transmission according to claim 1, characterized in that a similarly constructed sleeve means is provided also at the two input engageable means, is mounted thereat over a drive flange means and forms simultaneously the outer disk carrier for the inwardly disposed engageable means and the inner disk carrier for the outwardly disposed engageable means.

16. A transmission according to claim 15, characterized in that the last-mentioned sleeve means is also a sheet metal sleeve.

17. A transmission according to claim 1, characterized in that each last-mentioned sleeve means is provided at its one end with an inwardly turned flange means for the fastening on a respective transmission part.

18. A transmission according to claim 17, characterized in that the last-mentioned transmission part is a drive flange.

19. A transmission according to claim 17, characterized in that the last-mentioned transmission part is a planet gear carrier.

20. A transmission according to claim 1, characterized in that at least one of the two parts consisting of an abutment for one of said engageable means and of a ring-disk covering the free-wheeling means is secured at the open end of a sleeve means by means of snap ring means.

21. A transmission according to claim 2, characterized in that a ring disk also covering the free-wheeling means is arranged between an outer race of the free-wheeling means and the ring gear.

22. A transmission according to claim 15, wherein said sleeve means are constructed identically with respect to one another.

23. A transmission according to claim 22, wherein a spacer ring is provided between a flange means of said undulator sleeve means forming the inner disk carrier for the brake and a ring gear constituting said member of the planetary gear set.

24. A transmission according to claim 23, wherein an annular rotary disk and a spring ring are provided at the end of said last-mentioned sleeve means opposite said flange means for supporting an outer ring of said free-wheeling means.

25. A transmission according to claim 24, wherein an annular disk covering an idling gear is disposed between said outer ring of said free-wheeling means and said ring gear.

26. A planetary gear change-speed transmission for vehicles, which includes two frictional engageable means arranged concentrically one about the other at its input and a planetary gear set at its output, said planetary gear set being shifted by way of a free-wheeling means and a frictional engaging means acting as a brake on a member of the planetary gear set, characterized in that the member of the planetary gear set and the outer ring of the free-wheeling means are inserted into an undulatory sleeve means which forms simultaneously the inner disk carrier for the brake, and characterized in that an identically constructed undulatory sleeve means is provided also at the two input engageable means, is mounted thereat at a drive flange means and formes simultaneously the outer disk carrier for the inwardly disposed engageable means and the inner disk carrier for the outwardly disposed engageable means.

* * * * *